United States Patent [19]

Kamioka

[11] Patent Number: 4,747,873
[45] Date of Patent: May 31, 1988

[54] FRICTIONAL MATERIAL

[75] Inventor: Nobuo Kamioka, Kasukabe, Japan

[73] Assignees: Akebono Brake Industry Co., Ltd., Tokyo; Akebono Research & Development Centre Ltd., Hanyu, both of Japan

[21] Appl. No.: 95,450

[22] Filed: Sep. 11, 1987

[51] Int. Cl.[4] ............................................. B22F 1/00
[52] U.S. Cl. ............................... 75/229; 75/243; 419/11; 419/24; 428/408; 428/908.8
[58] Field of Search ............... 75/229, 243; 419/11, 419/24; 428/408, 908.8

[56] References Cited

U.S. PATENT DOCUMENTS

| | | | |
|---|---|---|---|
| 3,623,981 | 11/1971 | Bordon et al. | 75/243 |
| 3,827,129 | 8/1974 | Denham et al. | 75/243 |
| 4,072,516 | 2/1978 | Pepper et al. | 75/229 |
| 4,338,132 | 7/1982 | Okamoto et al. | 419/24 |
| 4,440,573 | 4/1984 | Ishizuka | 75/243 |
| 4,648,902 | 3/1987 | Giglia | 75/243 |

Primary Examiner—Stephen J. Lechert, Jr.
Attorney, Agent, or Firm—Oblon, Fisher, Spivak, McClelland & Maier

[57] ABSTRACT

A frictional material is disclosed, which is characterized in that, with the metal-containing composite material infiltrated with metal into the pore portions of composite comprising carbon material reinforced with carbon fibers, the porosity of said composite is adjusted to 5 to 15 vol. % and a metal or an alloy with a melting point of 125° to 1100° C. is infiltrated in amounts of 3 to 10 vol. %.

6 Claims, 3 Drawing Sheets

FRICTIONAL MATERIAL

BACKGROUND OF THE INVENTION

The present invention related to a frictional material, in particular, to the frictional material comprising carbon fiber/carbon composite infiltrated with metal and provides a frictional material for brake wherein the friction characteristic, wear resistance and mechanical strength are improved and still friction coefficient of moderate to high order can be obtained.

The carbon fiber/carbon material (hereinafter abbreviated as C/C composite) is an industrial material obtainable in such a way that the thermally molded article used carbon fibers (polyacrylonitrile type, pitch type, etc.) as reinforcement materials and pitch, phenol resin, furan resin, etc. as binders is carbonized or graphitized by firing. When using as the frictional material for brake etc., said C/C composite is excellent in the heat resistance, but, with a combination of the frictional material comprising C/C composite with the opposite member for friction, there is a limit to satisfy the friction performances diversifying depending on the needs. Moreover, when using as the opposite member for friction, there has been a shortcoming that the mechanical strength is insufficient.

The invention has been made to dissolve such shortcomings accompanied with C/C composite and the friction performance has been improved drastically by infiltrating small amount of metal into pores of C/C composite to achieve the anticipated object.

The metal-containing composite materials allowed the metal to be contained in C/C composite are known publicly. For example, in Japanese Patent Publication No. sho 53-27205, a composite material excellent in the strength and lubrication performance is obtained by allowing nonferrous metal or alloy consisting of two or more thereof with a melting point of 200° to 1100° C. to be contained in C/C composite with a porosity of 10 to 50 vol. % (content of carbon fibers : 40–60 vol. %) in amounts of 10 to 50 vol. %. Moreover, also in Japanese Unexamined Patent Publication No. sho 60-162748, a composite material buried the communicating pores in the carbon matrix of C/C composite with metal is proposed. In the latter, there are no distinct descriptions about the porosity and the content of metal (in the example, only the amount of carbon fibers is described to be about 70 vol. %), but, since the material is high in the strength at normal temperature and excellent in the heat resistance, aero and space use and uses as brake shoes and other constitutional materials for motor car and airplane are suggested.

Two inventions aforementioned are entirely different from the present invention in the objects and the friction performances thereof. In particular, the invention shown in Japanese Patent Publication No. sho 53-27205 relates to a sliding material, the use of which differs from the frictional materials for brake etc. contemplated in the present invention.

As a result of extensive investigations on the friction performance of C/C composite described above infiltrated with metal, the inventor has found that remarkable improvement of performance can be obtained within a fixed range of infiltration lower than the amount of infiltrated metal described in Japanese Patent Publication No. sho 53-27205.

SUMMARY OF THE INVENTION

Namely, in the frictional material according to the invention, the feature lies in that the porosity of composite comprising carbon material reinforced with carbon fibers is adjusted to 5 to 15 vol. % by repeating the impregnation of resin, firing and heat treatment, and a metal or an alloy with a melting point of 125 to 1100° C. is infiltrated into said pores in amounts of 3 to 10 vol. %. Through this treatment, the friction coefficient $\mu$ and the total amount of wear A of the frictional material become not less than 0.3 and not more than 0.20 mm, respectively, and the strength increases. At the same time, a remarkable effect that the fluctuation of friction coefficient due to the changes of friction temperature, friction velocity and friction pressure is small can be obtained.

DETAILED DESCRIPTION OF THE INVENTION

Figure 1:
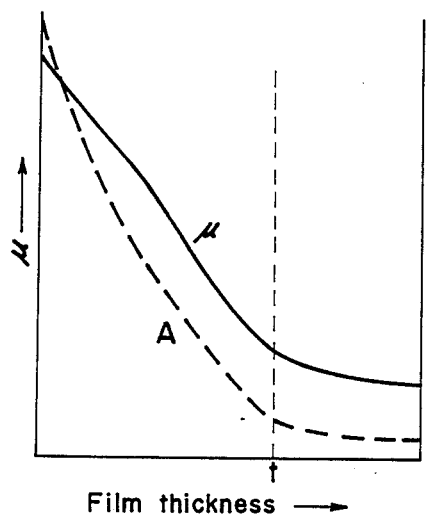
FIG. 1 and FIG. 2 are qualitative diagrams showing the relationships between thickness of molten film of metal and melting point of metal infiltrated and friction coefficient $\mu$ and total amount of wear A, respectively.

The C/C composite, being the substrate of composite material in the invention, can be produced by the publicly known method. Namely, the article impregnated with resin binder into an assemblage of carbon fibers and molded thermally is fired by heating at about 800° C. in a nonoxidative atmosphere to carbonize. However, in the invention, since it is necessary to adjust the porosity of C/C composite to 5 to 15 vol. %, the assemblage of carbon fibers aforementioned is made dense and the impregnation of resin, firing and heat treatment are repeated so that a fixed porosity can be obtained. At the final stage of firing, graphitization may be caused by raising the temperature over 2000° C.

Into the pore portions of C/C composite thus obtained, the metal melt is forced to enter. Under applied pressure, the metal is infiltrated into the pores, but this is limited only to continuous pores and the metal does not enter into independent pores (independently closed pores). In addition, since the wettability of metal melt is poor against carbon, the upper limit of the content of metal infiltrated was about 70% to the whole volume of pores in experiments.

In the invention, a metal or an alloy with a melting point of 125° to 1100° C. is used for the infiltration from the aspects of operation and the characteristics of product. As such metals or alloys, Cu, Zn, Sn, Pb, Sb, Bi, Cu-Sn, Cu-Zn, etc. can be exemplified. With the frictional material according to the invention, it is an essential condition for the metal to be infiltrated not to react with carbon as a matrix and with carbon fibers as reinforcement fibers at high temperature during friction with the opposite member for friction. In particular, the occurrence of hard and brittle substances such as intermetallic compounds etc. is not preferable, since the friction characteristics are instabilized and the softer portions tend to be worn selectively. In this sense, Al and the alloys thereof are unsuitable for the obJect of the invention and Fe and Fe alloys are also excluded because of the existence of such problems except the melting point.

The amount of infiltration of metal or alloy in the invention is 3 to 10 vol. %, preferably 4 to 8 vol. %. If the amount of metal infiltrated is over 10 vol. %, the wear resistance becomes better, but the friction coefficient $\mu$ is lowered to 0.3. Also, if the amount of metal is under 3 vol. %, $\mu$ increases inversely, but, at the same time, the total amount of wear A increases and further the strength as the frictional material decreases. In Table 1, the physical properties of C/C composite when infiltrated with Cu-14Sn in amounts of 5 to 9 vol. % are shown compared with those of C/C composite without infiltration. Here, remarkable improvements in the value of bending strength and that of impact can be seen.

TABLE 1

| C/C composite | Physical property | | | |
|---|---|---|---|---|
| | Density g/cm$^3$ | Hardness HRM | Bending strength kg/mm$^2$ | Charpy impact kg/cm$^2$ |
| Infiltrated with Cu—14Sn | 2.20-2.40 | 63-75 | 25-32 | 8-12 |
| Without infiltration | 1.60-1.64 | 60-70 | 12-15 | 4-7 |

Figure 2:
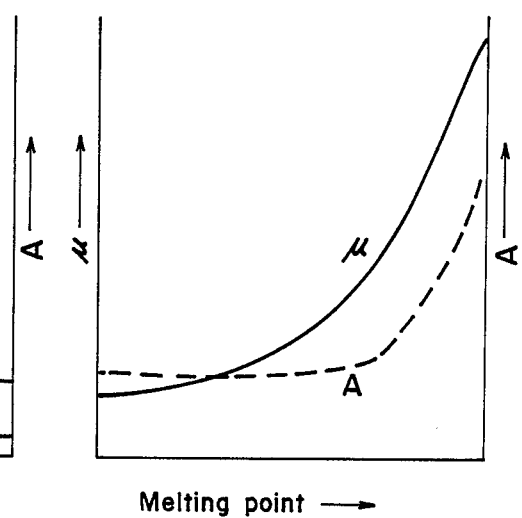

The reason why the friction performance of the frictional material comprising C/C composite infiltrated with metal in the invention is improved remarkably is considered as follows: Namely, a portion of metal infiltrated melts by the heat of friction generating at the time of friction and covers the surface of frictional material. The shear strength (viscous resistance) of this molten film of metal seems to contribute to the increase in the friction coefficient $\mu$ and the decrease in the total amount of wear A. The qualitative relationships between thickness of molten film of metal and $\mu$ and A are as shown in FIG. 1, where $\mu$ and A decrease with an increase in the thickness of molten film, and, when the film reaches to a certain thickness t, $\mu$ and A become to level off to show approximately constant values. In a region, the thickness being over t, the molten metal becomes to a state near the fluid lubrication and the direct contact of frictional material with opposite member for friction is hindered each other by this film. From similar reason, as shown in FIG. 2, if the melting point of metal to be infiltrated is low, the values of $\mu$ and A are low because of the molten film of metal being apt to be formed and, if the melting point rises, $\mu$ and A increase.

In following, the invention will be illustrated in more detail based on the examples, but the invention is not confined to these examples. Besides, for the measurements of the friction coefficient $\mu$ and the total amount of wear A in the examples, the brake dynamometer for automobile was used, wherein, making the pressure F 50 and 100 kgf and the velocity $\overline{V}$ 50 and 100 km/hr, $\mu$ was determined under four conditions combined these, and further the reductions of thickness of test pieces after carried out the friction up to each 100 times and totally 400 times under each condition were made A (mm).

EXAMPLE 1

Figure 3:
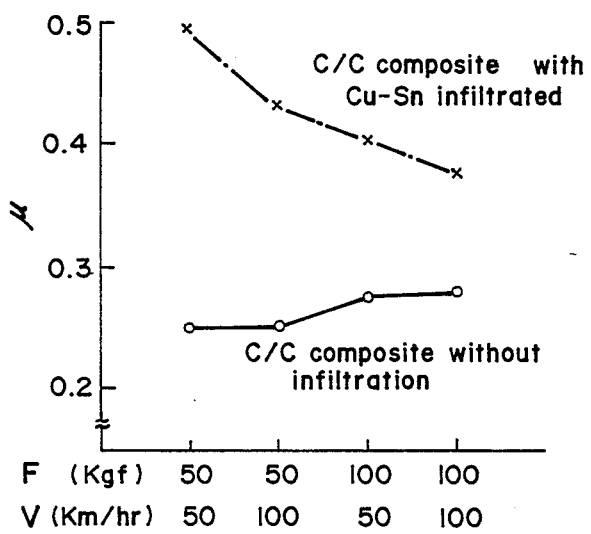
FIG. 3, FIG. 4, FIG. 5 and FIG. 6 are graphs showing values of friction coefficient $\mu$ and fluctuations of the infiltrated frictional materials in Example 1, Comparative example 1, Example 9 and Comparative example 2, respectively, under respective measurement conditions (four kinds of combinations between friction pressure F and friction velocity $\overline{V}$).

Using C/C composite adjusted the porosity to 10 vol. % as a substrate, Cu-14Sn alloy was infiltrated into this so as the amount of metal to become 6 vol. %. When carrying out the friction between some materials to determine the friction coefficient $\mu$ using said metal-containing composite material, results as shown in FIG. 3 were obtained (dotted chain line). In the same diagram, $\mu$ of C/C composite without infiltration is also shown in comparison (full line). It can be seen that, through the infiltration of Cu-Sn, $\mu$ is enhanced conspicuously under respective conditions of F and V. In this case, $\mu$ decreases as the friction conditions become severe, but the width of fluctuation in $\mu$ is relatively small and good as indicated by $\mu=0.49$ at F 50 kgf/$\overline{V}$ 50 km/hr and $\mu=0.38$ at F 100 kgf/$\overline{V}$ 100 km/hr. Moreover, the total amount of wear A is 0.14 mm in the case of the infiltration of metal, which is superior remarkably to 0.60 mm in the case of no infiltration.

COMPARATIVE EXAMPLE 1

Figure 4:
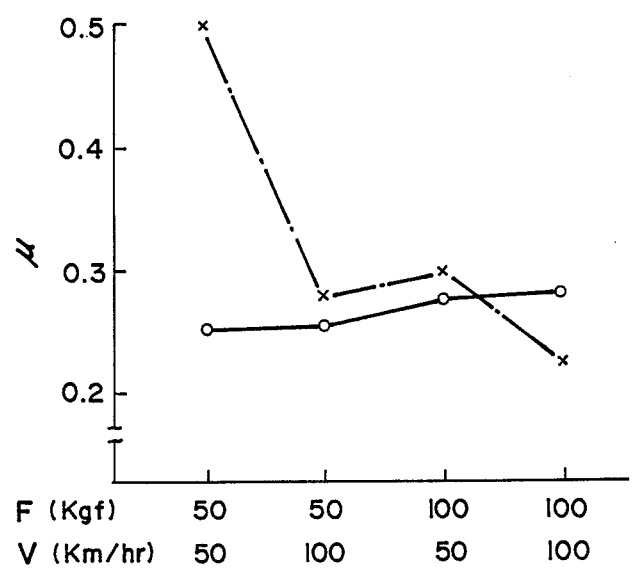

The same procedure as in Example 1 was conducted to obtain metal-containing composite material with 20 vol. % Cu-14Sn infiltrated, except the use of C/C composite with a porosity of about 30 vol. % obtained by making the volume ratio of carbon fibers 50% and re-impregnating no resin. The results of the determination of $\mu$ thereof similar to Example 1 was as shown in FIG. 4 (dotted chain line). Comparing with $\mu$ of C/C composite without the infiltration (full line) plotted in the same diagram, $\mu$ is as high as 0.49 under relatively mild conditions of F 50 kgf/$\overline{V}$ 50 km/hr, but all of $\mu$ become under 0.3 under otherwise conditions. Particularly, in a combination of F 100 kgf/$\overline{V}$ 100 km/hr, $\mu$ was equal to 0.22, which was lower than that in the case of no infiltration, and the width of fluctuation was also large. Moreover, A of metal-containing composite material described above was 0.28 mm, which was inferior to that of composite material with 6 vol. % infiltration in Example 1.

EXAMPLES 2 THROUGH 8

Using C/C composites with porosities of 8, 10 and 15 vol. %, respective metals or alloys of Zn, Pb, Sb, Pb-55Bi, Cu-14Sn and Cu were infiltrated in amounts of 3, 6, 10 and 20 vol. %, respectively. The values of $\mu$ (listed $\mu$s under both extreme conditions of F 50 kgf/$\overline{V}$ 50 km/hr and F 100 kgf/$\overline{V}$ 100 km/hr as the width of fluctuation) and those of A of these metal-containing composite materials are shown in Table 2.

TABLE 2

| | Metal | | Amount of infiltration vol. % | | | | | | | |
|---|---|---|---|---|---|---|---|---|---|---|
| | | | 3 | | 6 | | 10 | | 20 (Comparative example) | |
| Example No. | Metal or alloy | M.P. °C. | Friction coefficient $\mu$ | Amount of wear Amm | Friction coefficient $\mu$ | Amount of wear Amm | Friction coefficient $\mu$ | Amount of wear Amm | Friction coefficient $\mu$ | Amount of wear Amm |
| 2 | Zn | 419 | 0.44-0.35 | 0.32 | 0.44-0.33 | 0.12 | 0.35-0.24 | 0.08 | 0.30-0.18 | 0.04 |
| 3 | Pb | 327 | 0.42-0.34 | 0.22 | 0.41-0.33 | 0.11 | 0.30-0.26 | 0.08 | 0.28-0.18 | 0.04 |
| 4 | Sb | 631 | 0.50-0.35 | 0.48 | 0.45-0.33 | 0.12 | 0.40-0.27 | 0.08 | 0.34-0.19 | 0.05 |

TABLE 2-continued

| | Metal | | Amount of infiltration vol. % | | | | | | | |
|---|---|---|---|---|---|---|---|---|---|---|
| | | | 3 | | 6 | | 10 | | 20 (Comparative example) | |
| Example No. | Metal or alloy | M.P. °C. | Friction coefficient μ | Amount of wear Amm | Friction coefficient μ | Amount of wear Amm | Friction coefficient μ | Amount of wear Amm | Friction coefficient μ | Amount of wear Amm |
| 5 | Bi | 273 | 0.41–0.34 | 0.20 | 0.40–0.33 | 0.11 | 0.32–0.29 | 0.10 | 0.28–0.17 | 0.03 |
| 6 | Pb—55Bi | 125 | 0.40–0.34 | 0.18 | 0.38–0.30 | 0.11 | 0.32–0.27 | 0.10 | 0.26–0.17 | 0.03 |
| 7 | Cu—14Sn | 798 | 0.53–0.40 | 0.50 | 0.49–0.38 | 0.14 | 0.43–0.27 | 0.11 | 0.49–0.22 | 0.28 |
| 8 | Cu | 1083 | 0.56–0.47 | 0.62 | 0.50–0.37 | 0.28 | 0.46–0.32 | 0.24 | 0.48–0.24 | 0.32 |

As evident from Table 2, all metals infiltrated in Example 2 through 8 show good friction performances in the infiltration amounts of 3 to 10 vol. % and remarkable improvement effect can be recognized compared with C/C composite without metal or alloy infiltrated (see Example 1 or Comparative example 1). However, with 10 vol. % infiltration, the lower limits of μ drop below the line of 0.3 aimed in the invention in all cases, and, with 3 vol. % infiltration, some of A exceed 0.20 mm being the target. Thus, in order to put the invention in practice more safely, it is desirable to avoid these limiting amounts.

EXAMPLE 9

Figure 5:
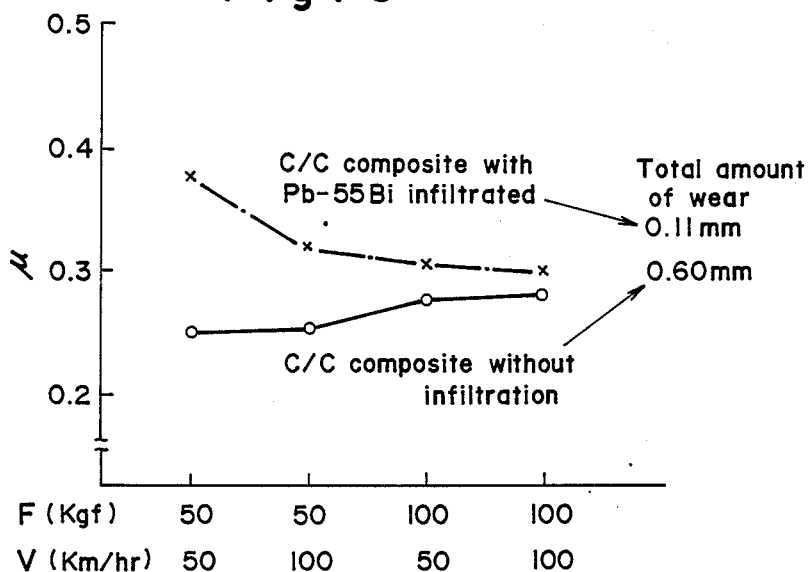

An example of test of friction performance when infiltrated with alloy with low melting point will be shown in this example. The infiltrating material was substituted by Pb-55Bi (melting point:125° C.) in Example 1 and the infiltration was carried out similarly under the condition of 6 vol. % to obtain the results as shown in FIG. 5. Besides, the total amount of wear of C/C composite infiltrated with Pb-55Bi and that of C/C composite without the infiltration were 0.11 mm and 0.60 mm, respectively.

COMPARATIVE EXAMPLE 2

Figure 6:
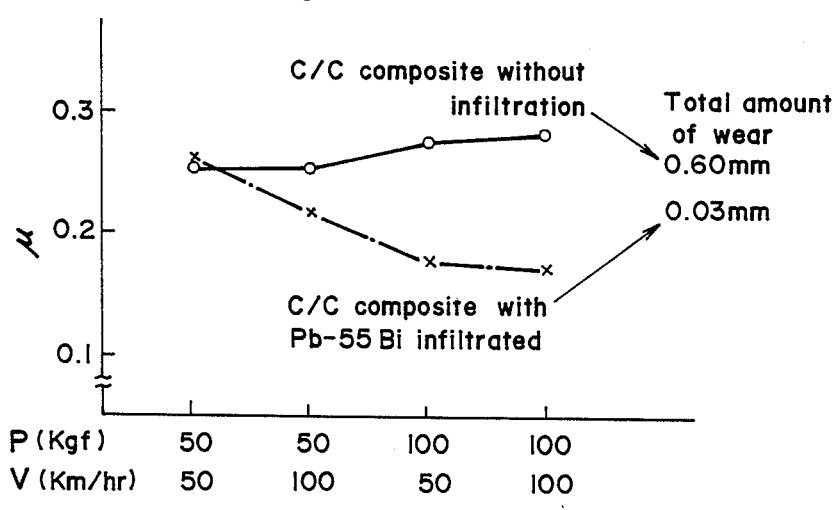

The results obtained by substituting the infiltrating material by Pb-55Bi alloy in Comparative example 1 and infiltrating under the condition of 20 vol. % similarly are shown in FIG. 6. Besides, the total amount of wear of C/C composite infiltrated with Pb-55Bi was 0.03 mm and that of C/C composite without the infiltration was 0.60 mm.

As evident from the descriptions above, it can be seen that the friction characteristics of C/C composite are improved remarkably through the infiltration of small amount of metal or alloy with low melting point Consequently, since broad uses are opened for brake and others as the frictional material, the industrial significance is extremely pronounced.

What is claimed is:

1. A frictional material characterized in that, with the metalcontaining composite material infiltrated with metal into the pore portions of composite comprising carbon material reinforced with carbon fibers, the porosity of said composite is adjusted to 5 to 15 vol. % and a metal or an alloy with a melting point of 125° to 1100° C. is infiltrated in amounts of 3 to 10 vol. %.

2. The frictional material according to claim 1, wherein the amount of infiltration of said metal or alloy is 4 to 8 vol. %.

3. The frictional material according to claim 1, wherein one kind of metal or alloy selected from Cu, Zn, Sn, Pb, Sb, Bi, CuSn, Cu-Zn, etc. is used as the infiltrating metal.

4. The frictional material according to claim 1, wherein the porosity of said C/C composite is 10 vol. % and, into these pore portions, Cu-14Sn alloy is infiltrated in amounts of 6 vol %.

5. The frictional material according to claim 1, wherein the porosity of said C/C composite is 10 vol. % and, into these pore portions, Pb-55Bi alloy is infiltrated in amounts of 6 vol. %.

6. The frictional material according to claim 1, wherein the porosity of said C/C composite is 8, 10 or 15 vol. % and the amount of infiltration of said metal or alloy is 3, 6 or 10 vol. %.

* * * * *